(12) United States Patent
Mahachek

(10) Patent No.: US 6,231,196 B1
(45) Date of Patent: *May 15, 2001

(54) LASER MARKING PROCESS AND PRODUCTS

(75) Inventor: Daniel W. Mahachek, Arlington Heights, IL (US)

(73) Assignee: Precision Laser Marking, Inc., Addison, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/829,495

(22) Filed: Mar. 27, 1997

(51) Int. Cl.[7] ....................................... G02B 5/08
(52) U.S. Cl. .................. 359/838; 359/839; 359/884; 359/15; 40/158.1; 40/798
(58) Field of Search .................... 359/838, 839, 359/884, 15, 25, 33; 40/158.1, 798, 541; 216/65; 63/20; 434/365

(56) References Cited

U.S. PATENT DOCUMENTS

| | | | |
|---|---|---|---|
| 4,517,040 | * 5/1985 | Whitted | 156/153 |
| 4,681,324 | * 7/1987 | Karabed et al. | 273/295 |
| 5,583,704 | * 12/1996 | Fujii | 359/884 |
| 5,609,043 | * 3/1997 | Benderly | 63/23 |
| 5,762,375 | * 6/1998 | Kogutt et al. | 281/37 |
| 5,801,356 | * 9/1998 | Richman | 219/121.68 |
| 5,817,243 | * 10/1998 | Shaffer | 216/65 |

* cited by examiner

*Primary Examiner*—Mohammad Sikder
(74) *Attorney, Agent, or Firm*—Welsh & Katz, Ltd.; Thomas W. Tolpin (57) ABSTRACT

The reflective backing of a mirror or other product is marked, engraved, scribed, or decorated with a laser beam to produce a decorative display assembly with a laser-enhanced image thereon. This can be accomplished by vaporizing part of the reflective backing with the laser beam. Multi-colored laser-enhanced images can also be formed. The decorative display assembly can also be backlit or back colored to further enhance the attractiveness of the laser-enhanced image.

3 Claims, 6 Drawing Sheets

FIG.1

FIG.3 RASTER

FIG.4 VECTOR

LASER MARKING PROCESS AND PRODUCTS

BACKGROUND OF THE INVENTION

The invention pertains to mirrors, and more particularly, to decorating mirrors and other products.

Mirrors have been available for centuries. Mirrors are optical devices, with a smooth, polished surface that forms images by the reflection of rays of light. Mirrors are useful to view a person's own reflection or image, as well as to reflect light for a variety of purposes. Historically, polished metal and other shiny surfaces functioned as mirrors.

Mirrors have been made of brass, and mirrors of bronze were in use among the ancient Egyptians, Greeks, and Romans. Polished silver was also used by the Greeks and Romans to produce reflections. Crude forms of glass mirrors were first made in Venice in 1300. By the end of the 17th century, mirrors were made in Britain and the manufacture of mirrors developed subsequently into an important industry in the other European countries and in the United States.

Glass mirrors were later developed with better reflective qualities and less distortion. One method of previously making glass mirrors included backing a sheet of glass with an amalgam of mercury and tin. The surface of the mirror was overlaid with sheets of tinfoil that were rubbed down smooth and covered with mercury. A woolen cloth was held firmly over the surface by iron weights for about a day. The glass was then inclined and the excess mercury drained away, leaving a lustrous inner surface. The first attempt to back the glass with a solution of silver may have been made by the German chemist Justus von Liebig in 1836. Various methods have been developed since then that depend on the chemical reduction of silver salt to metallic silver.

In the manufacture of some mirrors today, in cases where the above principle is utilized, the plate glass is cut to size, and blemishes are removed by polishing with rouge. The glass is scrubbed and flushed with a reducing solution such as stannous chloride before silver is applied, and the glass is then placed on a hollow, cast-iron tabletop, covered with felt, and kept warm by steam. A solution of silver nitrate is poured on the glass and left undisturbed for about an hour. The silver nitrate is reduced to a metallic silver and a lustrous deposit of silver gradually forms. The deposit is dried, coated with shellac, and painted.

In other methods of mirror production, the silver solution is added with a reducing agent, such as formaldehyde of glucose. Silvering chemicals are often applied in spray form. Special mirrors are sometimes coated with the metal in the form of vapor obtained by vaporizing silver electrically in a vacuum. Large mirrors have been coated with aluminum in the same way.

Recently, plastic mirrors have been developed. Plastic mirrors are lighter than glass mirrors and will not shatter as readily as glass. Some plastic mirrors, however, do not provide the same optical qualities, clarity and reflectivity as glass mirrors. Moreover, plastic mirrors can distort and warp at high temperatures.

In the past, glass panes, glass windows, glass shower doors, and glass mirrors have been decorated in a variety of ways. Glass panes, glass windows, glass shower doors and glass mirrors have been chemically etched, such as with a fluoride or chloride-containing gas to frost the desired areas or surfaces of the glass panes, glass windows, glass shower doors or glass mirrors. Glass panes have also been sandblasted. The front surfaced of glass panes, glass windows, glass shower doors and glass mirrors have also been painted, such as with a brush, by stencils, spray painting, or by silk screening. Painted surfaces, however, often readily chip and degrade over time from use, cleaning, wear and tear, as well as from prolonged environmental exposure to sunlight, acid rain, and pollutants. Mechanical engraving of glass with awls and hand scribes have been attempted, but the end results are generally crude and lack detail, luster, and aesthetic appeal.

It is, therefore, desirable to produce an improved decorative display assembly, such as a mirror, in a manner which overcomes most, if not all, of the preceding problems.

SUMMARY OF THE INVENTION

Improved mirrors and other products are superbly decorated, marked, engraved, etched, or scribed by a laser to produce a decorative display assembly. The aesthetically appealing mirrors and other products of the decorative display assembly are of high quality, clarity and luster. The novel mirrors and products of the decorative display assembly are attractive, pleasing, economical and beautiful. Advantageously, the laser marked mirrors and products of the decorative display assembly have fine impeccable detail which is durable and does not readily wear, smudge, or degrade.

In order to produce the decorative display assembly, an article or decorative display is placed in the path of a laser beam emitted from a laser. An image is marked, scribed, engraved, decorated or otherwise formed on the article with the laser beam to provide the decorative display assembly. The image can comprise a transparent laser enhanced image. Desirably, the image comprises a: design, portrait, picture, photograph, name, wording, lettering, numbers, logo, pattern, or other indicia. The decorative display assembly is subsequently removed from the path of the laser beam for further processing, storage, or shipment.

The article or decorative display can be a: glass mirror, plastic mirror, hanging mirror, hand held mirror, looking glass, glass pane, plastic pane, reflective surface, sign, display, coaster, tray, mirrored product, mirrored box, shadow box, candle box, jewelry box, kiosk display, rack, coffee cup rack, hat rack, coat rack, door placards, wall sconce, lighting fixture, chandelier, centerpiece, light bulb, placemat, computer mouse pad, refrigerator magnet display, key chain, desk set, picture frame, paper weight, hanging sun catchers, mobile, chime, napkin holder, utensil holder, tissue dispenser, vase, cup, drinking glass, mug, sculpture, motivational piece, recognition display, award, mirrored corner, mirror runner, mirror decorative kit, clock, watch, window, shower door, decorative plastic article, decorative glass article, curved mirror, and flat mirror.

Generally, the novel decorative display assembly has a front surface and a back surface. A portion of at least one or the surfaces is translucent, opaque, or colored, with a transparent laser-enhanced image thereon. In the preferred form, the article comprises a mirror having a reflective backing with a protective backside comprising an opaque or colored coating, and the coating and backing is vaporized with the laser beam to form a laser-enhanced image. The decorative display assembly can be backlit by natural sunlight or by an image enhancer positioned behind the back surface of the decorative display assembly, such as a lightbulb, candle, colored surface, paint, reflective surface, mirror, metal, plastic, paper, paperboard, or cardboard. Back lighting or coloration further enhances the image and provides additional contrast.

A more detailed explanation of the invention is provided in the following description and appended claim taken in conjunction with the accompanying drawings.

DETAILED DESCRIPTION OF THE PREFERRED EMBODIMENTS

Figure 1:
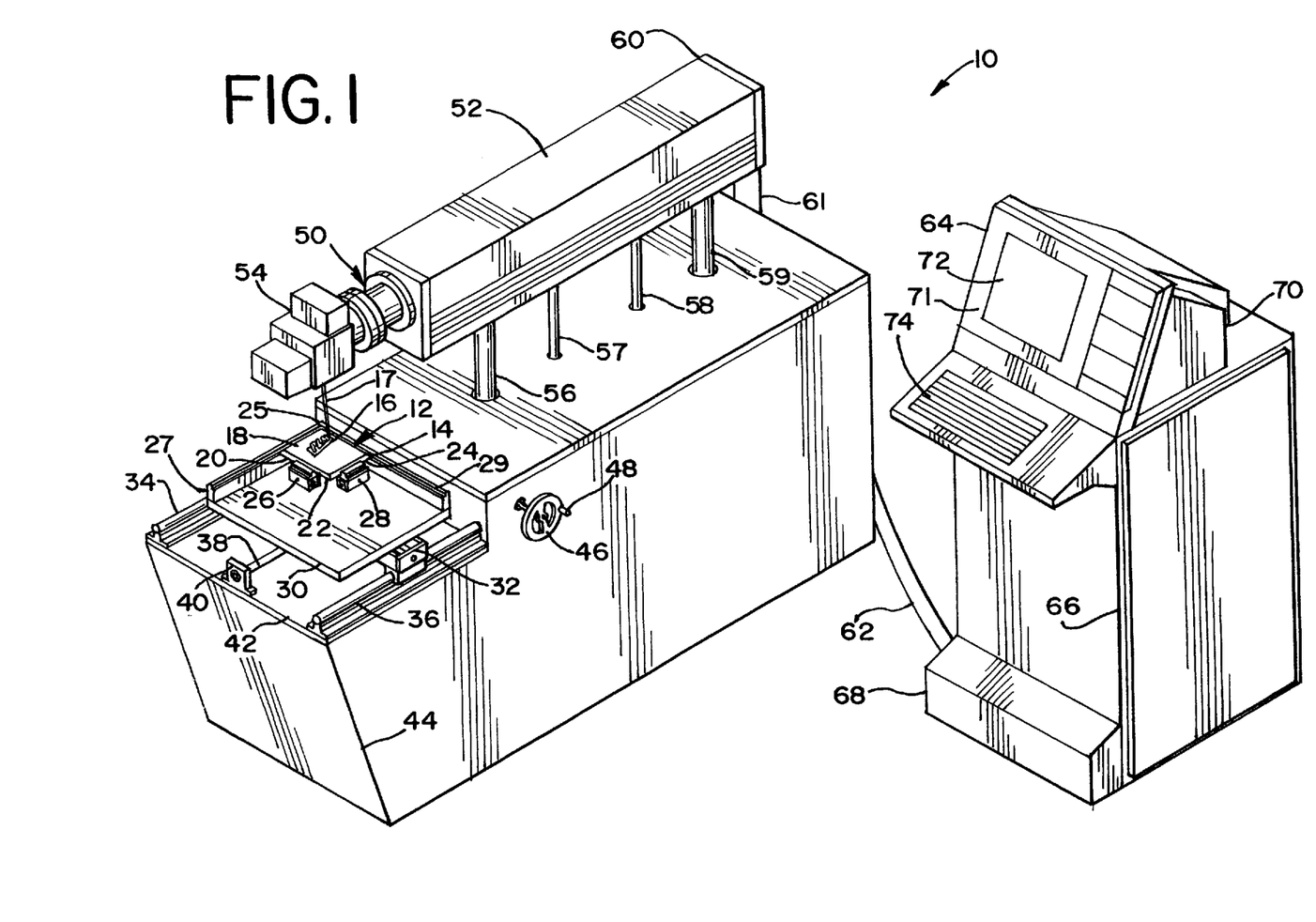
FIG. 1 is a perspective view of a laser system and process for producing a decorative display assembly in accordance with principles of the present invention.

A laser system 10 (FIG. 1) and process are provided to produce a decorative display assembly 12 comprising a decorative display or article 14, preferably a glass mirror, with a laser-enhanced decorative image 16 thereon. The laser-enhanced image is marked, engraved, scribed and/or decorated on the article by a laser beam 17. The decorative display 14 has a front surface 18 and a back surface 20. A reflective backing 22 comprising silver or chromium can cover part or all of the back surface. The protective backside of the backing can be black, or colored or coated with pigments to provide an opaque portion 24. The laser-enhanced decorative image on the decorative display or article can be a: design, pattern, portrait, picture, photograph, name, word, lettering, number, logo, pattern, or other indicia.

The decorative display or article can be held and fixedly secured by a fixture 25 (FIG. 1) comprising vices or clamps 26 and 28 and upward L-shaped flanges 27 and 29 or rails along adjacent sides of a support plateform or table 30. The underside of the table is mounted on a carriage assembly 32 which provides an x-y translator that slides and rides upon longitudinal rails 34 and 36 and an intermediate longitudinal rod 38 elevated by a flange 40 of an end frame, which are secured to the stepped portion 42 and left side of a laser cabinet 44.

A rotatable wheel 46 (FIG. 1) with a control knob 48 extends laterally outwardly from the laser cabinet to manually adjust, raise, and lower a laser 50 comprising a laser rail 52 and head providing a beam delivery optics assembly 54 positioned above and aligned in registration with the decorative display or article. The laser rail is supported by vertically moveable posts 56–59. The laser rail can be protected and enclosed by a rail cover 60 or rail housing. The beam delivery optics delivery assembly, laser beam, x-y translator comprising the support plateform, carriage assembly, rails, rod, etc, and the workpiece, comprising the decorative display or article, can be covered by a safety enclosure and protective housing to prevent human access to the laser beam during operation of the laser.

The laser rail is connected by a flexible umbilical 61 (FIG. 1) providing a power line 62 to a laser power supply 64 and control console 66 with a base 68. The laser power supply comprises a central processing unit (CPU) such as a microprocessor semiconductor chip, computer chip, logic controller, logic interface, or computer 70, with a monitor 71, display screen 72 and keyboard 74.

Figure 2:
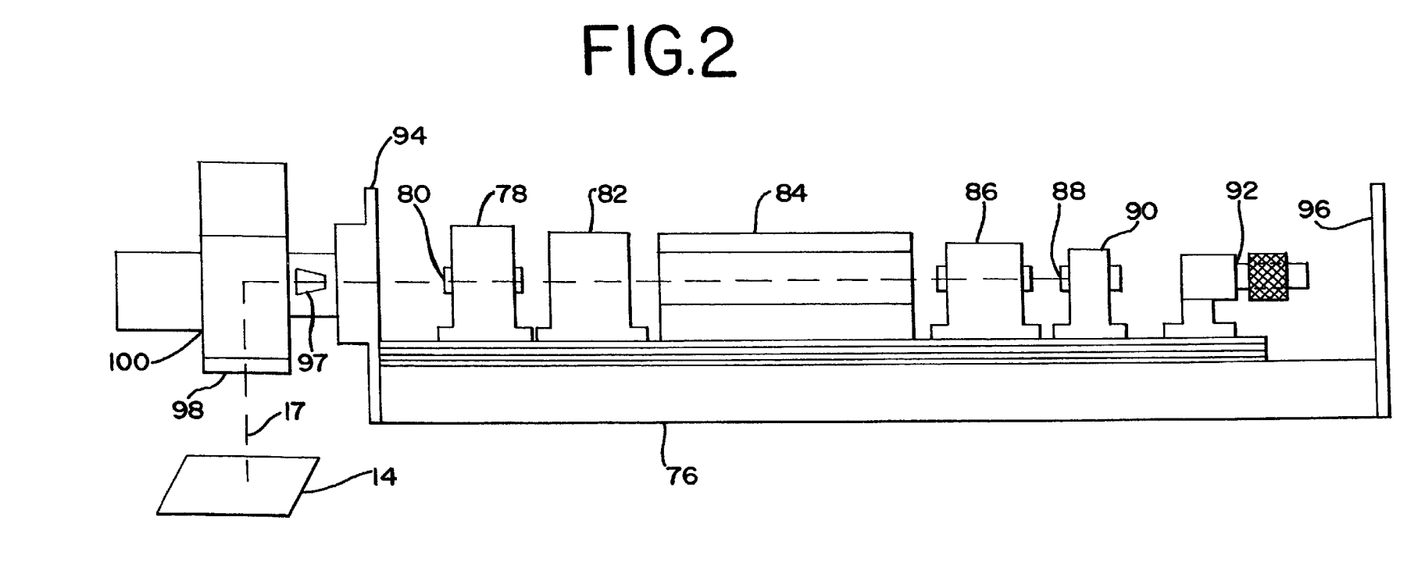
FIG. 2 is an enlarged longitudinal view of a laser rail and beam delivery optics assembly.

As shown in FIG. 2, the laser rail has a rail 76 upon which is mounted: a front mirror mount assembly 78 with a front mirror 80, a shutter and aperture assembly 82, a laser head assembly 84 comprising a laser head with a Nd:YAG crystal and a krypton arc lamp, a Q-switch 86, a back mirror assembly 88 with a back mirror 90, and a photodiode assembly 92. Front and rear end plates 94 and 96 extends upwardly from the rail. The head comprising the beam delivery optics assembly has: a focal input lens 97, focal output lens 98, and a galvanometer and scanner assembly 100 with x-axis and y-axis paddle assemblies.

The laser preferably comprises a solid state, neodymium: yttrium aluminum, gallium or garnet laser (Nd:YAG laser) for high speed beam-steered laser marking and permanence of the marked image. In some circumstances, it may be desirable to use other types of lasers, such as a: diode laser, helium-neon laser, ion laser, excimer laser, helium-cadmium laser, carbon dioxide laser, or other solid state lasers.

For Nd:YAG lasers, neodymium (Nd) provides the lasing media and are embedded in the YAG crystal host. The pump source to excite the lasing medium atoms can be a krypton arc lamp which emits light to a focal region along the center axis of the Nd:YAG crystal. As the pump excites the lasing media, sufficient energy is applied to create a population inversion and initiate spontaneous emission of photons. Optical feedback is created by the front and back mirrors at the ends of the laser rail to reflect photons traveling along the longitudinal axis back into the media. The reflected photons cause other upper level atoms to emit their photons by stimulated emission to provide light amplification. The front mirror has an aperture to discharge 10% or less of the amplified light reflecting between the mirrors as an output laser beam.

More specifically, a four step process of energy transfer occurs in Nd:YAG crystals. First, the Nd atoms are elevated and excited to one or two energy levels with the absorption of light emitted by the krypton arc lamp. Lamp light in the pump band ranges from about 0.73 to 0.8 $\mu$m. The Nd atoms then go through a rapid decay to a meltable upper laser level to create a population inversion between the upper and lower laser levels. When the Nd atoms decay further to the lower laser level, energy is emitted as a photon of light with a wavelength of 1.06 $\mu$m. This laser transition is the source of both spontaneous and simulated emission which comprises the laser beam. Thereafter, the Nd atom experience a decay back to the ground state to repeat the process.

The Q switch comprises an acoustic-optic Q switch comprising transparent quartz with a piezoelectric acoustic transducer bonded to one side. The Q switch produces a pulsed laser output by alternately blocking and unblocking the path of reflection between the front and rear mirrors. More specifically, when a radio frequency (RF) signal is applied to the transducer, an acoustic wave is projected through the quartz of the Q switch which momentarily compresses the quartz. This produces a periodic change in the index of refraction of the quartz. Some of the light passing through the Q switch is diffracted to a small angles and misses the rear mirror. With this loss of optical feedback, which is necessary to stimulate emission, lasing action ceases. Nd is a unique lasing material which exhibits a long spontaneous or upper-level lifetime. During the period that the RF signal is applied to the Q switch and stimulated emission is suspended, the population of the upper laser level continues to grow as more Nd atoms absorb lamp energy. During the non-lasing period, the upper level stores considerable amount of energy. When the RF signal is removed and optical feedback is restored, the result and burst of laser light can be several kilowatts of peak power. Q switching is an excellent way to produce very short pulse width and high peak power pulses of light from a comparatively low power laser. The shutter assembly blocks the losing action for longer periods of time.

The krypton lamp can be powered by a direct current (DC) power source. Excess heat from the krypton lamp and quartz cell of the Q switch can be dissipated by a cooling system, such as a fan or a deionized water cooling system.

The output laser beam of he Nd:YAG laser is directed and focused by optical components in the beam delivery optics assembly. Beam-steering is accomplished by two mirrors mounted on high speed, high accuracy galvanometers. The galvanometers are mounted on paddle assemblies to provide independent beam motion on both the x axis and y axis of the marking field. The beam-steered laser marking system deflects the beam across the surface of the decorate display or article much like a pencil on paper. An upollimator can be provided to increase the diameter of the laser beam prior to focusing. A multi-element flat-field focusing assembly can be positioned optically forwardly of the beam-steering mirrors to maintain a consistent focused spot of the laser beam throughout the marking field of the decorative display or article.

Laser marking is a non-contact thermal process relying on heat generated by the laser beam to alter the surface of the workpiece comprising the decorative display or article. The output power of the laser can be adjusted by increasing or decreasing the electric current of the krypton arc lamp. If the pulse rate of the Q switch is set to a low frequency, such as 1 kHz, the long duration between pulses will produce a very high peak power pulses with narrow pulse widths of about 100 nanoseconds. High peak power pulses at low frequencies can increase the surface temperature of the workpiece very rapidly which can result in material vaporization of the reflective backing and minimal heat conduction into the mirror or other product. If the pulse rate of the Q switch is set to a higher frequency, such as 10 kHz, the peak power will be much lower due to the shorter charge time between pulses. At high repetition rates, the lower peak power will produce much less vaporization but conduct more heat.

For deep marking of the laser-enhanced image, such as to a depth greater than 0.002 inches, each point on the engraved image can require exposure to several laser pulses. Also, the beam velocity has to be reduced until the desired depth of the laser mark is attained. For shallow marking, the speed of the laser beam can be increased to the laser system's maximum speed or until the separation between pulses is not visually attractive. As a general rule, pulses should overlap at least 50% to give the appearance of a continuous engraved, marked, scribed or decorative line in the laser-enhanced image of the decorative display or the article. The laser system can also reposition the laser beam between characters or graphic images to attain faster cycle times. If the workpiece or target material is highly reflective to the laser wavelength, a higher power may be necessary, which can be attained by decreasing the pulse rate of the Q switch as explained above, or the beam velocity can be decreased.

Most metallics are very absorptive to Nd:YAG. Materials suitable for Nd:YAG laser marking include: plastic, ceramics, and metal. Plastic suitable for laser marking can include: polyethylene, polypropylene, ethylene ethyl acrylate (EEA), acrylonitrile butadiene styrene (ABS), polyvinyl chloride (PVC), polyurethane, polyethylene, polyethylene oxide, polycarbonate, olefins, polyolefins, polyamides, nylon, polyamide-imides, polyimide sulfones, styrenes including styrene/acrylonitrile (SAN), styrene/butadiene (SB), styrene/maleic anyhydryde, vinyls including polyvinyl acetal, polyvinyl acetate (PVAC), polyvinyl alcohol (PVAL), polyvinyl butyryl (PVB), polyvinyl carbazole (PVK), polyvinylpyrrolidone (PVP), polyvinyl chloride acetate (PVCA), polyvinyl fluoride (PVF), polyvinylidene chloride PVDC), polyoxymethylene, acrylonitrile/styrene/ acrylate (ASA), acetal, polyformaldehyde, acetate, ethylene/ vinyl acetate (EVA), butyrate, acrylic, polymethyl methacrylate, acrylonitrile/methyl/methacrylate (AMMA), cellulosics, cellulose nitrate (CN), cellulose propionate (CP), ethyl cellulose (EC), cellulose acetate (CA), cellulose acetate butyrate (CAB), cellulose acetate propionate (CAP), cellulose formaldehyde (CF), cellulose triacetate (CTA), polyethylene terephthalate (PET), fluropolymers, chlorinated polyethylene (CPE), chlorinated polyvinyl chloride (CPVC), ionomers, polyarylate, polyarylterephthalate (PAT), polyarylether (PAE), polyarylamid, polyaramide, polyarylsulfone, polyphthalamide, polyarylsulfone, polybutylene, polyester, ethylene, polyuryletherketone, polymethylpentane, polyphenylene sulfide, polyphtralamide, and polysulfone.

Multi-colored display and articles can be molded of colored translucent plastic and painted with a white or light color base coat and a darker contrasting top coat. The laser beam can selectively remove the dark coat to expose the white or light undercoat with the desired laser-enhanced image. The contrast between the different colors provides an excellent daytime display. For night viewing, the display can be backlit to project the color of the translucent plastic through the laser engraved imaged.

In order the mark the decorative display or article with a desired image, a software program can be accessed by the operator of the central processing unit (CPU) to specify the geometry of the desired image. The geometrical programming of the laser includes specifying the positioning, movement and lasing paths for the laser beam. Geometrical programming can be accomplished by use of the computer keyboard or by using computer aided design (CAD) software to convert the geometric information to proper form required by the laser's geometric control. The proper laser control parameters are also entered into the CPU. A design, portrait, picture, photograph, name, wording, lettering, numbers, logo, pattern or other indicia can be scanned into the CPU by an optical scanner or optical reader. When the signals of the geometric program of the image is generated by the CPU, the laser is activated to emit and steer the laser beam to mark, engrave, scribe or decorate the display or article with the desired laser-enhanced image. The laser can be shut off by the Q switch and CPU during positioning moves and is activated when executing lasing paths. The lasing paths can be straight lines or circular interpolations. The laser marking system can also contain internal programming to provide alphanumeric marks as selected by the operator of the CPU.

Figure 3:
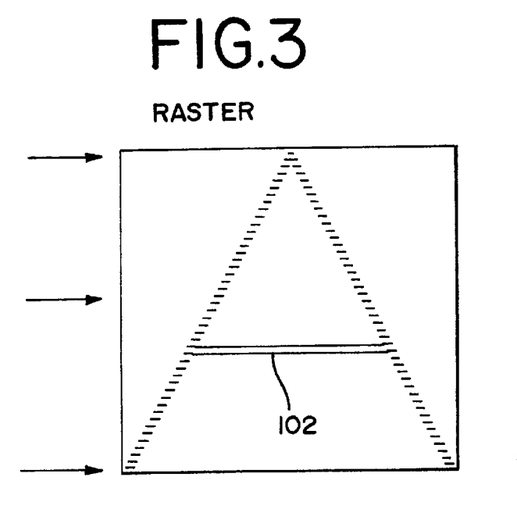
FIG. 3 is greatly enlarged raster image.

In the preferred process, an image to be engraved is created or replicated. If an image is to be replicated, the procedure would be as follows. The image would be scanned into a computer, such as by an optical scanner, for first level digitizing, providing a raster or bitmap type file 102 (FIG. 3). A raster file is a pixel representation of an image with a fixed and defined resolution and is generated and outputted much like an ink jet printer with repeating incremental horizontal scan lines. The raster file can be automatically cleaned up via a software program of the CPU or manually cleaned up by the operator of the CPU via the keyboard, and thinned or kurf-compensated to reduce each area to compensate for the kurf or the diameter of the laser beam.

Figure 4:
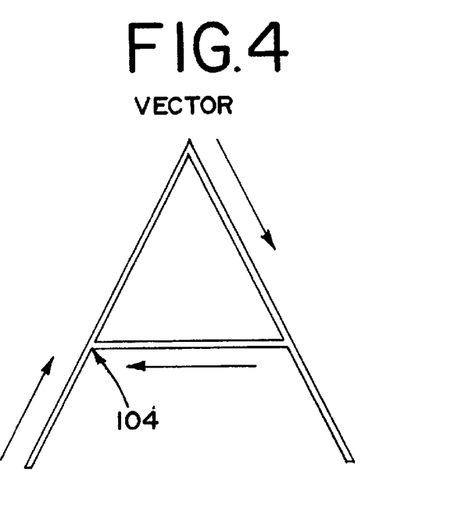
FIG. 4 is greatly enlarged vector image.

The CPU can then be manipulated manually via a keyboard or by a software program to transform the raster file into a vector file 104 (FIG. 4). A vector file is an entity representation of an image with absolute coordinate geometry including polylines, lines arcs and circles. The output of a vector file would be similar to the way a person would draw an image. Many software packages are available to assist in tracing and vectorizing an image. Packages such as Adobe Streamline brand software produced by Adobe Company can automatically trace a pcx file providing a rough vector file in need of straightening. Cleanup can be conveniently accomplished by a CAD package. The image file can be optimized such that it will be lased in an orderly fashion such as from top left to bottom right and not jumping around unnecessarily. Once the image has been vectorized utilizing a variety of software such as CAD & CAM packages, the file can be exported as a DXF file, and converted to a language understood by the laser including specific move and draw commands to steer the laser beam. This is usually accomplished through a post processor piece of software supplied by the laser manufacturer which converts computer vector files into the laser manufacturers language. This image file is then included in a command file which can contain scaling information, positioning information and actual laser parameters.

Once an image is in an appropriate format for the laser to execute, the next step is to establish laser parameters for that image, as well as for the mirror or other decorative display or article that is being lased on. Plastic requires far less power for laser marking than glass and is more sensitive to burning if not cleaned prior to lasing. The laser beam sees the clear glass or plastic mirror or other decorative display or article, as transmissive and will pass through the clear layer of the transparent glass or plastic to the reflective backing, unless the clear layer is dirty in which case the laser beam will couple with the dirt and generate heat. The actual power, beam speed and Q switch frequency can be selected for a particular image. Generally 40 watts of power with a 4 kHz Q switch frequency and laser marking speeds of 10 inches per second yield good results. If it is necessary to have the lased marking very deep, two passes or more at these settings are sometimes used. Typically, laser marking, engraving and decorating are done from the front side of the mirror or other decorative display or article, so that the laser beam passes through the clear glass or plastic before reaching the reflective backing. Laser marking, decorative and engraving from the back side of the mirror or other decorative display or article, such that the reflective metalized backing is the first material to come in contact with the laser beam can also be accomplished, however, it requires that symmetrical, complementary or mirror-images be lased. The laser beam can be focused precisely on the reflective metalized surface of the backing.

The workpiece comprising the mirror or other decorative display or article, is positioned under the laser in a locating fixture. The fixture can seat and support the outer edges of the mirror or other article or decorative display, such that during front lasing, the laser beam is free to pass through the clear layer (body) of the transparent glass or plastic and vaporize the reflective backing without marking the clear layer of the transparent glass or plastic. The fixture can comprise two fixed corner locators and two movable magnetic fixtures locators comprising vices or clamps with an on off switch and rubber on all surfaces which contact and protect the mirror or other decorative display or article from breaking. A substrate fixture plate made of steel or other metal, can be used to allow the movable magnetic locators to be locked down to the plate, wherever necessary, to fully support any size mirror or other decorative display or article.

The programmable XY table can be homed and indexed into position. The laser can then be initiated to execute the image marking program resulting in the selective vaporization of the reflective backing to produce the desired laser-enhanced image on the workpiece. The mirror or other decorative display or article, can then be removed from the fixture. The laser engraved area can be cleaned with a glass cleaning solvent.

Figure 5:
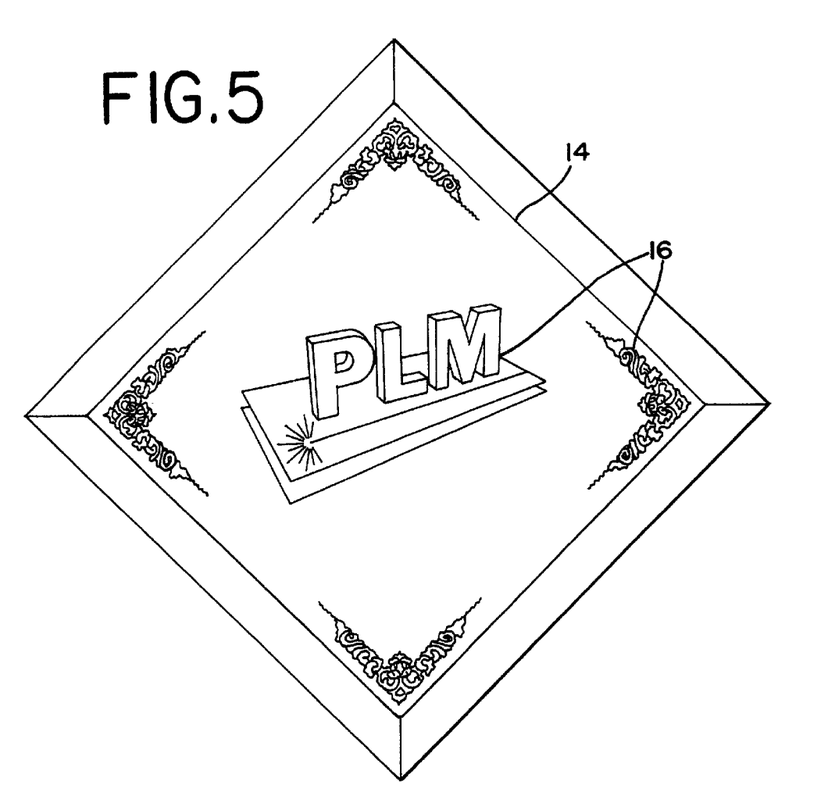
FIG. 5 is a front view of a decorative mirror produced in accordance with the process of this invention.
Figure 6:
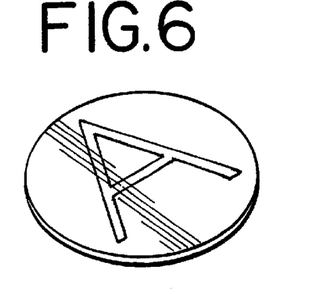
FIG. 6 is a perspective view of a coaster.
Figure 7:
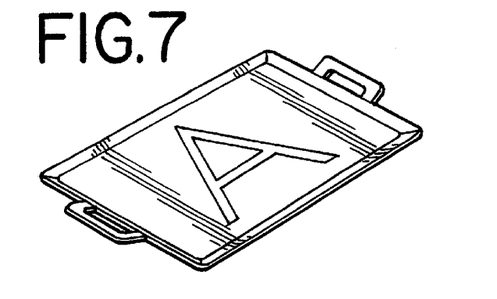
FIG. 7 is a perspective view of a tray.
Figure 8:
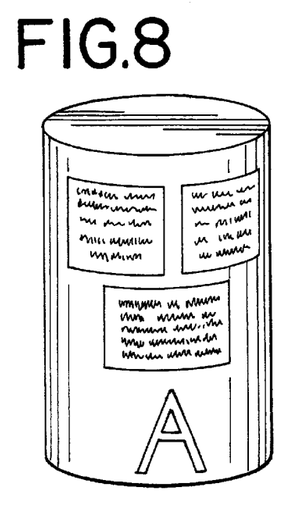
FIG. 8 is a perspective view of a kiosk display.
Figure 9:
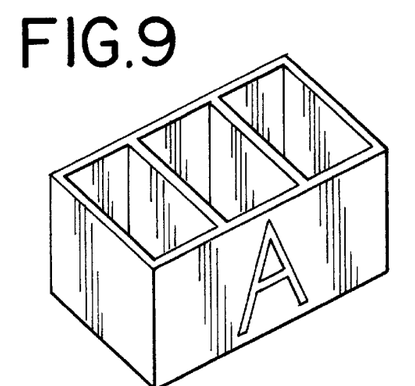
FIG. 9 is a perspective view of a rack.
Figure 10:
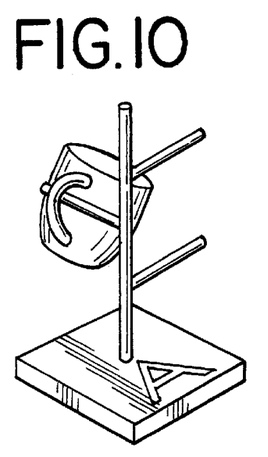
FIG. 10 is a perspective view of a coffee cup rack.
Figure 11:
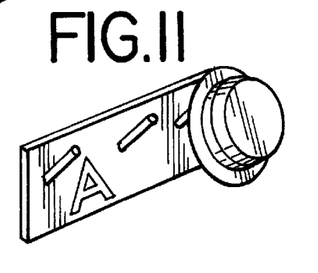
FIG. 11 is a perspective view of hat rack.
Figure 12:
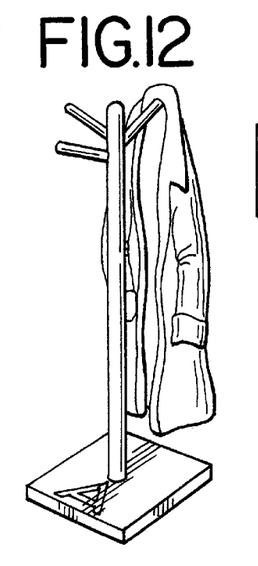
FIG. 12 is a perspective view of a coat rack.
Figure 13:
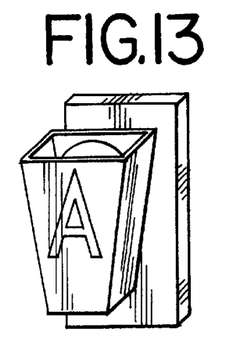
FIG. 13 is a perspective view of a wall sconce.
Figure 14:
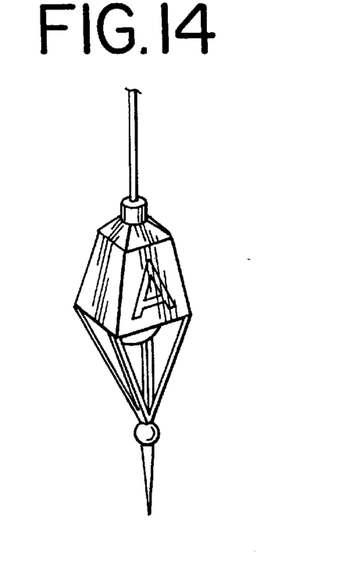
FIG. 14 is a perspective view of a portion of a chandelier.
Figure 15:
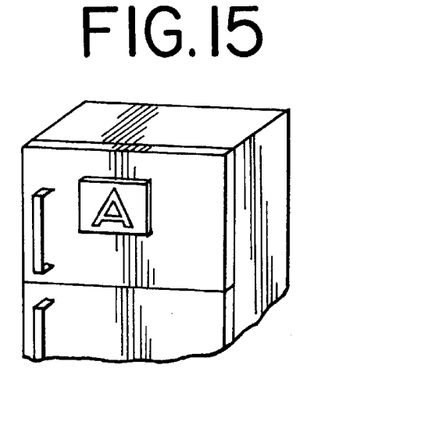
FIG. 15 is a perspective view of a refrigerator magnet.
Figure 16:
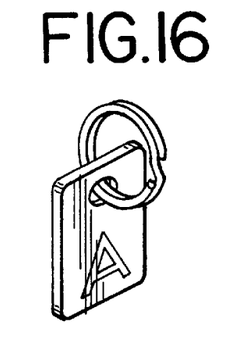
FIG. 16 is a perspective view of a key chain.
Figure 17:
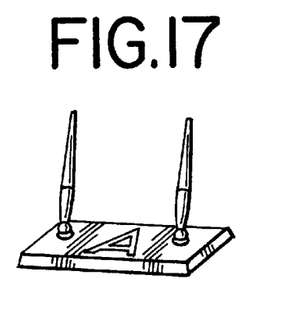
FIG. 17 is a perspective view of a desk set.
Figure 18:
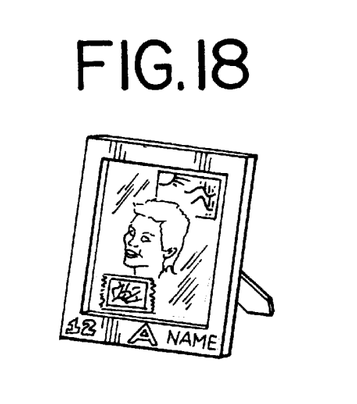
FIG. 18 is a perspective view of a picture frame.
Figure 19:
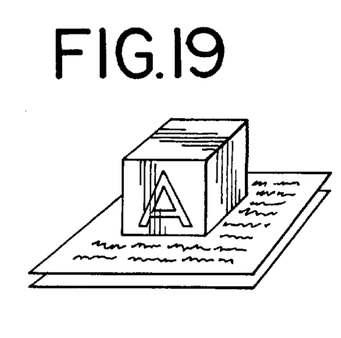
FIG. 19 is a perspective view of a paperweight.
Figure 20:
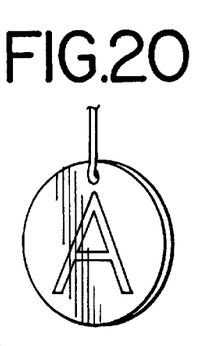
FIG. 20 is a perspective view of a hanging sun catcher.
Figure 21:
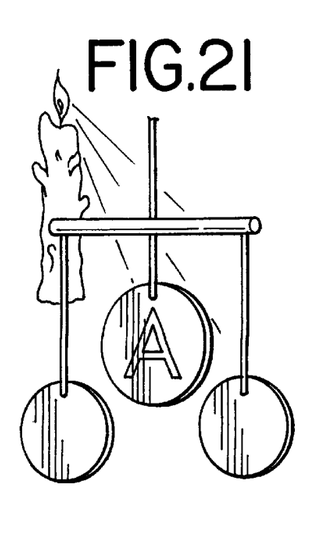
FIG. 21 is a perspective view of a mobile.
Figure 22:
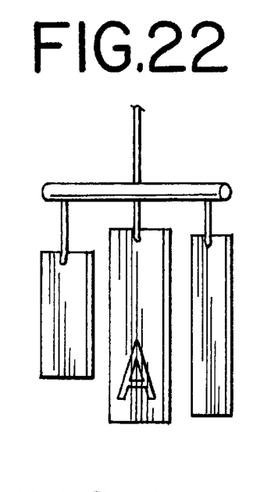
FIG. 22 is a perspective view of a chime.
Figure 23:
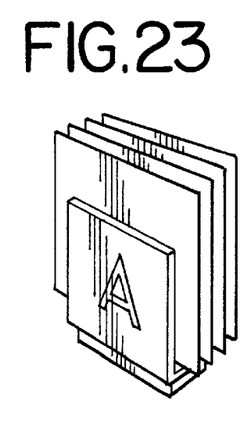
FIG. 23 is a perspective view of a napkin holder.
Figure 24:
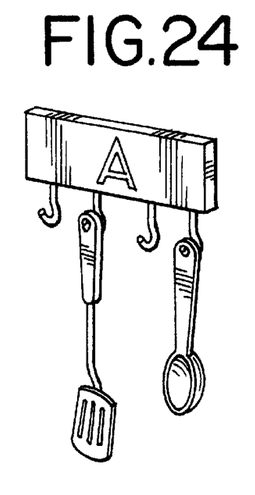
FIG. 24 is a perspective view of a utensil holder.
Figure 25:
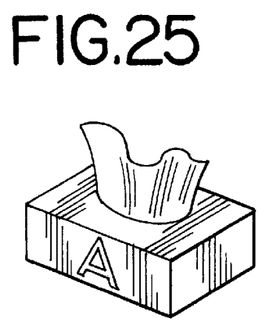
FIG. 25 is a perspective view of a tissue dispenser.
Figure 26:
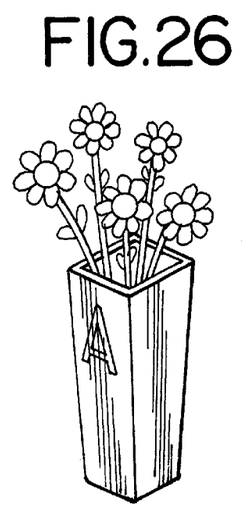
FIG. 26 is a perspective view of a vase.
Figure 27:
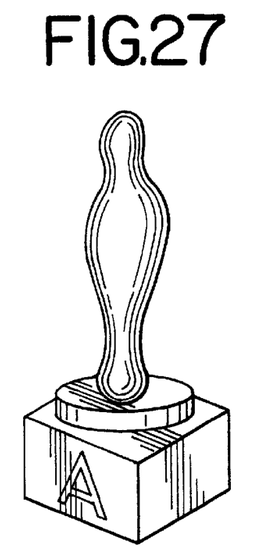
FIG. 27 is a perspective view of a sculpture.
Figure 28:
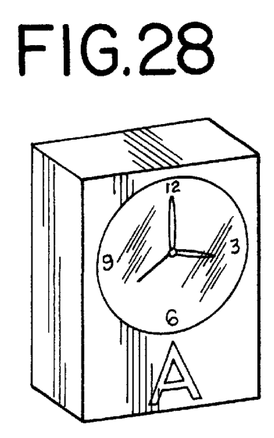
FIG. 28 is a perspective view of a clock.
Figure 29:
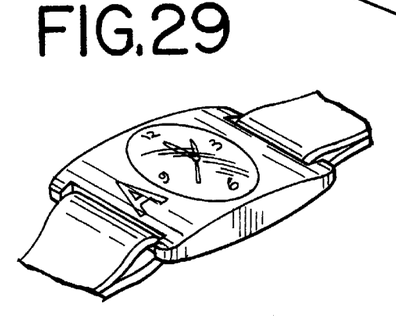
FIG. 29 is a perspective view of a watch and illustrating portions of a watchband.

Laser enhanced imaging into the reflective backing of a mirror or other decorative display or article can be performed by a 60 watt steered beam Nd:YAG laser operating at a wavelength of 1064 NM. The computer controlled laser beam can be focused on the reflective metalized surface of the mirror or other decorative display or article allowing the selective vaporization of the coating to produce, mark, engrave, scribe and form the image. Using a laser to selectively remove the backing applied to glass, such as the mirror 14 shown in FIG. 5, or other decorative display or article, provides for laser-enhance imaging with unsurpassed detail and quality. A laser beam provides laser-engraved line widths of as little as 0.003 inch. The laser beam is accurate to 0.0001 inch or better. Driving the fine point of the laser beam with computer controlled galvanometers, yields exceptional detail, quality and flexibility.

The laser engraved mirror or other decorative display or article is now ready for color to be added, if desired. This is done in a variety of ways from simply placing something of color behind the mirror, or by back lighting the mirror, painting the back side of the reflective backing, or back filling the laser-engraved areas. The beauty of the laser marking process and products can be amplified when considering how color can be subsequently added to the laser marked product. The laser can provide a perfect detailed stencil for color on the back or protected side of the coated glass or plastic. Colored paper, colored metal, reflective materials, mirror, paint, ink, sunlight, artificial light, candle light, or light from a fire, can provide back lighting or back coloration. Subsequent back lighting and or coloration further enhances the image and provides additional contrast.

Multi-colored imaging can also be accomplished with this laser marking process in the following manner. The computerized image would be separated by color. For example, if the image was to be two colors, such as green and blue, the first colored area, e.g., green area, would only be lased and the mirror removed and painted the first color, i.e., green. After drying, the second colored area, e.g., blue area would be lased through the green layer, and the mirror removed and painted the second color, i.e., blue, yielding two color imaging of the same fine detail and superb quality as one color. The mirror with the laser-enhanced image is now a finished product and can either be shipped or assembled to provide the finished product comprising the decorative display assembly.

In the preferred operation, a mirror or other article or decorative display, is placed, supported and secured in a fixed position in a fixture of the Nd:YAG laser so as to be positioned in the expected, prospective and projected path of the laser beam. The mirror or other article or decorative display is preferably glass or plastic with a transparent body and a reflective backing. The transparent body preferably comprises a substantially planar or flat area. The selected image is inputted, accessed or retrieved on a central processing unit (CPU), such as a microprocessor, computer, semiconductor chip, computer chip, logic controller, logic interface, or computer network. The image can be a: design, portrait, picture, photograph, name, wording, lettering, numbers, logo, pattern, indicia, or combinations thereof. The image can be inputted into the CPU by: (1) optically scanning the image into the CPU with an optical scanner or optical reader; (2) manually inputting the image into the CPU with a computer keyboard; (3) copying the image on the CPU; (4) creating the image on the CPU; or (5) manipulating or changing an image on the CPU.

After the above steps have been accomplished, the Nd:YAG laser is activated to emit a laser beam. The CPU automatically controls the power, pulse rate and cycles of the laser beam. The Nd:YAG laser steers and moves the laser beam across part of the reflective backing along a path controlled by the CPU and corresponding to the image in the CPU. The laser beam forms, marks, engraves, scribes, and/or decorates a laser-enhanced image on a portion of the reflective backing, which proportionally corresponds to the same, smaller or larger image on the CPU. Simultaneously, the laser beam vaporizes a portion of the reflective backing which corresponds to the laser-enhanced image. Desirably, vaporization, as well as forming, marking, engraving, scribing and/or decorating, of the laser-enhanced image is accomplished by the laser beam with substantially deforming, degrading or damaging the transparent body of the mirror or article or decorative display. Advantageously, the vaporized portion of the reflective backing, which corresponds to the laser-enhanced image, can transmit light therethrough, but substantially prevents the reflection of light therefrom. Upon completion of the above steps, the mirror or other article or decorative display, with the laser-enhanced image, can be removed from the fixture of the Nd:YAG laser. Desirably, the mirror or other article or decorative display, with the laser-enhanced image, provides an attractive decorative display assembly.

In the preferred process, the mirror or other article or decorative display, is placed front side up on the fixture of the laser so that the back of the reflective backing faces downwardly. In this manner, the laser beam is steered through the transparent body of the mirror or other article or decorative display, before vaporizing a portion of the reflective backing. In some circumstances, it may be desirable to place the mirror or other article or decorative display, front side down on the fixture of the laser so that the back of the reflective backing faces upwardly. In such circumstances, the laser beam can vaporize the reflective backing before passing through the transparent body of the mirror or other article or decorative display.

Multi-colored laser-enhanced images can also be formed as described above. Also, back lighting and back coloring can also be used as previously described, to further enhance the attractiveness and appearance of the laser-enhanced image of the decorative display assembly.

While the decorative display or article is preferably a glass mirror, other decorative displays and articles can be marked, engraved, scribed or decorated in accordance with the laser marking process of this invention, such as a: plastic mirror, hanging mirror, hand held mirror, looking glass, glass pane, plastic pane, reflective surface, sign, display, coaster, tray, mirroral product, mirrored box, shadow box, candle box, jewelry box, kiosk display, rack, coffee cup rack, hat rack, coat rack, door placards, wall sconce, lighting fixture, chandelier, centerpiece, lightbulb, placemat, computer mouse pad, refrigerator magnet display, key chain, desk set, picture frame, paper weight, hanging sun catchers, mobile, chime, napkin holder utensil holder, tissue dispenser, vase, cup, drinking glass, mug, sculpture, motivational piece, recognition display, award, mirrored corner, mirror runner, mirror decorative kit, clock, watch, window, shower door, decorative plastic article, decorative glass article, curved mirror, and flat mirror.

Among the many advantages of the laser marking process and products of this invention are:

1. Superb decorative display assemblies.
2. Outstanding products with high quality laser-enhanced images.
3. Superior decoration with unsurpassed detail for mirrors and other products.
4. Excellent multi-colored displays.
5. Improved backlit-enhanced articles.
6. Desirable decorative products with permanent long-lasting images.
7. Good resistance to wear and degradation, and maintenance free.
8. Attractive mirrors made of glass or plastic.
9. Aesthetically appealing.
10. Effective marking and engraving.
11. Economical.
12. Dependable.
13. Durable
14. Beautiful Although embodiments of this invention have been shown and described, it is to be understood that various modifications and substitutions, as well as rearrangements of parts, components, displays, articles and process steps, can be made by those skilled in the art without departing from the novel spirit and scope of this Invention.

What is claimed is:

1. A decorative display assembly, comprising:
   a decorative display mirror having a front surface and a back surface, and said mirror comprising a material selected from the group consisting of glass and plastic;
   at least one of said surfaces of said mirror having a two-dimensional laser-enhanced image thereon;

said decorative display assembly comprising an article selected from the group consisting of a coaster, tray, kiosk display, rack, coffee cup rack, hat rack, coat rack, wall sconce, chandelier, refrigerator magnet display, key chain, desk set, picture frame, paper weight, hanging sun catcher, mobile, chime, napkin holder, utensil holder, tissue dispenser, vase, sculpture, clock, and watch;

said two-dimensional laser-enhanced image is selected from the group consisting of a laser engraved image and a laser marked image; and said decorative display mirror and said decorative display assembly being present in the absence of an opaque material tape necessary to absorb the wavelength output beam of a laser so as to heat an underlying region to a plasma state.

2. A decorative display assembly in accordance with claim 1 wherein said image is selected from the group consisting of a: design portrait, picture, photograph, name, wording, lettering, numbers, logo, pattern, indicia, and combinations thereof.

3. A decorative display assembly in accordance with claim 1 including an image enhancer positioned behind said back surface of said decorative display mirror, said image enhancer being selected from the group consisting of a lightbulb or candle.

* * * * *